United States Patent Office 3,074,974
Patented Jan. 22, 1963

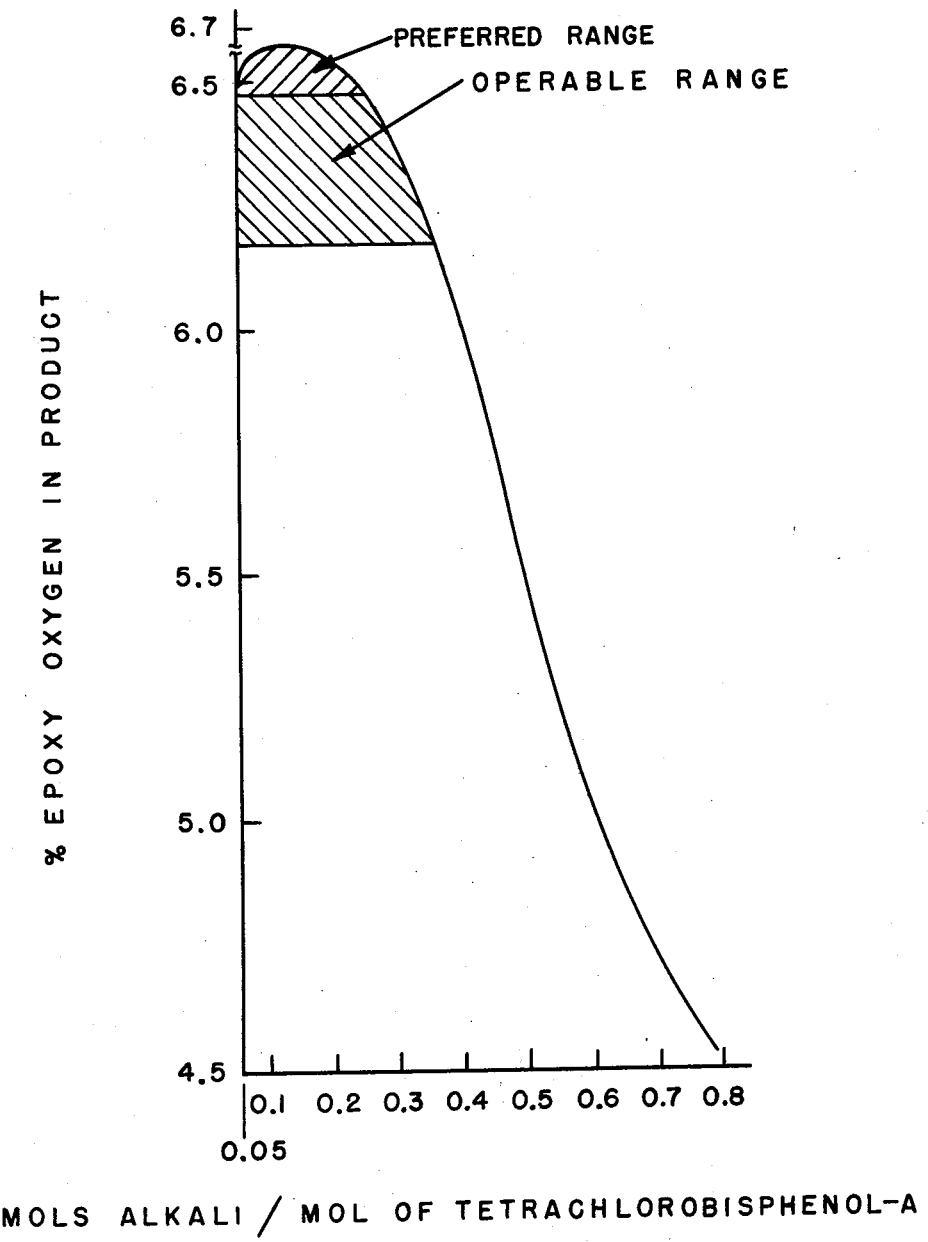

3,074,974
METHOD FOR THE PREPARATION OF DIGLYCIDYL ETHER OF TETRACHLOROBISPHENOL-A
Stanley E. Gebura, Springfield, Mass., assignor to Monsanto Chemical Company, St. Louis, Mo., a corporation of Delaware
Filed Dec. 6, 1957, Ser. No. 701,156
6 Claims. (Cl. 260—348.6)

The present invention relates to the diglycidyl ether of tetrachlorobisphenol-A and to a novel method for the preparation thereof. The invention further relates to the preparation of the di(beta-hydroxy-gamma-chloro-n-propyl) ether of tetrachlorobisphenol-A which is an intermediate in the preparation of the diglycidyl ether of tetrachlorobisphenol-A.

It is an object of this invention to provide the diglycidyl ether of tetrachlorobisphenol-A.

Another object of this invention is to provide an efficient and economical process for the preparation of the diglycidyl ether of tetrachlorobisphenol-A.

Still another object of this invention is to provide the di(beta-hydroxy-gamma-chloro-n-propyl) ether of tetrachlorobisphenol-A.

Yet another object of this invention is to provide an efficient and economical process for the preparation of the di(beta-hydroxy-gamma-chloro-n-propyl) ether of tetrachlorobisphenol-A.

Other objects and advantages of the invention will be apparent from the following detailed description thereof when read in conjunction with the single attached FIGURE which illustrates the effect of one of the reaction parameters upon the epoxy oxygen analysis of the product obtained by the process of this invention.

It has been discovered that the diglycidyl ether of tetrachlorobisphenol-A can be prepared in substantially quantitative yield and substantially free from polymeric epoxides by a novel two step process.

In the first step of the process one molar portion of tetrachlorobisphenol-A is admixed with at least two molar portions of epichlorohydrin and a critical quantity of strong alkali such as an alkali metal hydroxide is added thereto at carefully controlled temperatures. The addition of the strong alkali catalyzes the condensation of the epichlorohydrin with the tetrachlorobisphenol-A to form the di(beta-hydroxy-gamma-chloro-n-propyl) ether of tetrachlorobisphenol-A. In the second step of the process, after removing excess epichlorohydrin if any, the di(beta-hydroxy-gamma-chloro-n-propyl) ether of tetrachlorobisphenol-A is dehydrochlorinated with alkali to obtain the desired diglycidyl ether of tetrachlorobisphenol-A. The reactions involved are set forth below:

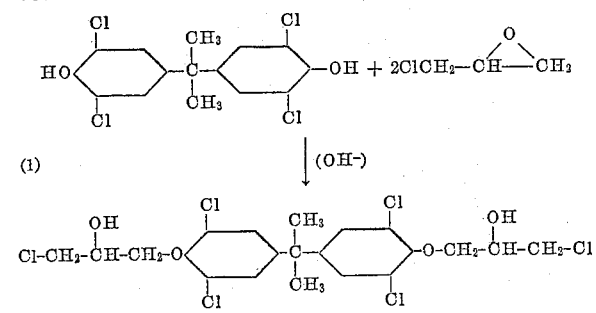

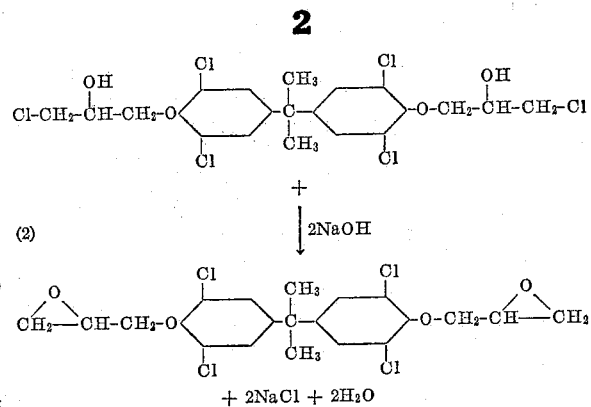

The following examples are set forth to illustrate more clearly the principle and practice of this invention to those skilled in the art.

EXAMPLE I

Part A

A total of 1464 grams of (4 mols) of tetrachlorobisphenol-A and 1510 grams (16 mols) of epichlorohydrin are charged to a glass reaction vessel fitted with a stirrer and reflux condenser. The reaction mixture is heated to 85° C. and 64 grams (1.6 mols) of sodium hydroxide are added thereto in a single charge, said sodium hydroxide being charged as a 30% aqueous solution. A vigorous exothermic reaction takes place within about one minute after the addition of the sodium hydroxide and the reaction mixture begins to reflux at a temperature of 95–100° C. The rate of reflux is controlled by intermittent external cooling. Within about 6 minutes after the addition of the sodium hydroxide, the exothermic reaction subsides somewhat and it becomes necessary to supply external heat to maintain reflux. At this same time, sodium chloride precipitates from the reaction mixture thereby indicating that di(beta-hydroxy-gamma-chloro-n-propyl) ether of the tetrachlorobisphenol-A has been formed and that a portion thereof has been dehydrochlorinated to form the diglycidyl ether of tetrachlorobisphenol-A.

The reaction mixture is maintained at 95–100° C. and a sample is withdrawn from the reaction mixture at the end of 20 minutes for infrared analysis. This analysis does not show the characteristic absorption bands of the tetrachlorobisphenol-A, and thus indicates that the reaction is probably substantially complete. However, the reaction mixture is maintained at reflux for another hour to assure complete reaction. The reaction mixture is cooled and a total of 725 grams of unreacted epichlorohydrin is recovered by vacuum distillation, this quantity representing 96% of the excess epichlorohydrin charged to the reaction mixture.

Part B

The reaction product from Part A above and 960 ml. of an aqueous solution containing 288 grams (7.2 mols) of NaOH are charged to a glass reaction vessel fitted with a stirrer and reflux condenser. The resulting mixture is heated to a temperature of 112–115° C. for 10 hours and then washed well with water. The overall yield of diglycidyl ether, calculated on tetrachlorobisphenol-A, is 98%. The epoxy oxygen analysis of the final product is 6.52% as compared with the theoretically required 6.69%. The close agreement between the epoxy oxygen analysis and theory is highly significant as it indicates that, at most, very small quantities of polymeric epoxides have been formed by reaction between tetrachlorobisphenol-A and the diglycidyl ether of tetrachlorobisphenol-A. When poured into cold ethanol, the product is recovered in the form of a white powder which melts at 93–98° C.

To obtain the desired diglycidyl ether of tetrachlorobisphenol-A in high yield and substantially free of polymeric epoxides it is necessary to carry out the process of the invention under carefully controlled conditions. In particular, the conditions employed to initiate the condensation of epichlorohydrin with tetrachlorobisphenol-A are very critical.

The necessity for the careful control of reaction conditions is dictated by the consideration that several competing reactions are possible. As a result, the reaction conditions must be selected so as to favor the formation of the desired products at the expense of the undesired but possible co-products. When alkali is added to the mixture of epichlorohydrin and tetrachlorobisphenol-A, reactions (1) and (2) (set out earlier herein) proceed simultaneously, although at different reaction rates with reaction (1) running at a rate faster than reaction (2). It will be noted further that reaction (2) consumes alkali, which is the essential catalyst in reaction (1). Thus, it is important to run the first step of the process under conditions that reaction (1) is substantially complete, i.e., substantially all of the tetrachlorobisphenol-A has reacted with epichlorohydrin, before any appreciable quantity of the diglycidyl ether of tetrachlorobisphenol-A is formed via reaction (2). In particular it is necessary to initially add to the reaction mixture sufficient alkali to both (a) catalyze reaction (1), and (b) supply the alkali consumed in reaction (2) during the interval between the initiation and completion of reaction (1).

A further competing reaction is that between alkali and epichlorohydrin to form glycidol as set forth below:

(3)

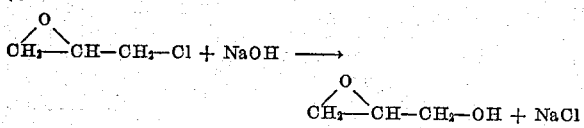

Yet another competing reaction is the condensation between tetrachlorobisphenol-A and the diglycidyl ether of tetrachlorobisphenol-A to form polymeric epoxides.

The second step of the process, i.e, the dehydrochlorination of the di(beta-hydroxy-gamma-chloro-n-propyl) ether of tetrachlorobisphenol-A is relatively straight forward and is substantially free of competing reactions under the conditions normally employed in this dehydrochlorination reaction.

When the process is run under the controlled conditions subsequently set forth in greater detail, the yield of the desired diglycidyl ether is substantially quantitative and substantially all of the excess epichlorohydrin, if any, employed in the reaction is recovered. Of equal importance, the epoxy oxygen content of the product is substantially that required by theory. This factor is important in that low epoxy oxygen contents indicate the presence of polymeric epoxides formed by the condensation of the tetrachlorobisphenol-A with the diglycidyl ether of tetrachlorobisphenol-A.

In carrying out the initial step of the process, at least 2 molar portions and preferably 3–4 molar portions of epichlorohydrin are admixed with 1 molar portion of tetrachlorobisphenol-A. The resulting mixture is heated to a temperature of 50–95° C. and 0.05–0.35 molar portion of an alkali such as an alkali metal hydroxide is added thereto in a single charge. Preferably the alkali is added to the reaction mixture as a concentrated aqueous solution.

In the second step of the process, after the excess epichlorohydrin (if any) is removed, alkali is added to the di(beta-hydroxy-gamma-chloro-n-propyl) ether of tetrachlorobisphenol-A and the resulting reaction mixture is heated until the reaction therebetween is complete. The quantity of alkali employed is such that the total quantity added in the first and second steps of the process constitutes at least 2 molar portions and preferably a slight excess thereover. If desired, the dehydrochlorination reaction may be run in inert solvents such as benzene, dioxane, etc.

The above noted ratios of alkali to tetrachlorobisphenol-A are for monoequivalent bases such as alkali metal hydroxides. Such alkali metal hydroxides, particularly sodium hydroxide and potassium hydroxide, are the most suitable alkalies for use in the process of the invention both from the viewpoint and cost and reaction performance. If, however, it should be desirable or expedient to employ a polyequivalent base such as sodium carbonate or trisodium phosphate, the previously stated values should be divided by the appropriate equivalency factor of the base, e.g., 2 in the case of sodium carbonate, 3 in the case of trisodium phosphate, etc. Thus, the portion of alkali employed may be expressed in terms of equivalents, the number of equivalents being numerically equal to the mols of base multiplied by the number of hydroxyl ions that the molecule yields when ionized.

The effect that the quantity of alkali employed in the first step of the process has upon the reaction is illustrated in Examples II–VI.

EXAMPLES II–VI

Five condensations are carried out between epichlorohydrin and tetrachlorobisphenol-A employing the general procedures described in Example I, Part A. In each run 1 gram mol of tetrachlorobisphenol-A and 4 gram mols of epichlorohydrin are admixed and heated to 85° C. and sodium hydroxide is added thereto as a 30% aqueous solution. The quantity of sodium hydroxide employed is, respectively, 0.05, 0.10, 0.20, 0.35 and 0.80 gram mols. All of the reactions are then run for 30 minutes under reflux at 95° C. The runs in which at least 0.1 gram mol of sodium hydroxide is employed are exothermic and self-sustaining, whereas external heat must be supplied to obtain reflux when the quantity of added sodium hydroxide is 0.05 gram mol.

In the second step of the process, after removing the excess epichlorohydrin by vacuum distillation, sodium hydroxide is added to the reaction vessel as a 30% aqeous solution and the resulting reaction mixture is heated to a temperature of 110–115° C. for ten hours. The quantity of sodium hydroxide added in the second step is sufficient, when added to the quantity employed in the first step of the process, to constitute 2.2 gram mols.

The percent of excess epichlorohydrin recovered for each run is determined. The products are analyzed for epoxy oxygen content and for hydrolyzable chloride content. From these analyses, the percentages of diglycidyl ether of tetrachlorobisphenol-A and di(beta-hydroxy-gamma-chloro-n-propyl) ether of tetrachlorobisphenol-A in the product are calculated in accordance with the following formulae:

Percent diglycidal ether $$= \frac{\text{percent analyzed epoxy oxygen} \times 100}{6.69}$$

Percent di(beta-hydroxyl-gamma-chloro-n-propyl) ether $$= \frac{\text{percent analyzed hydrolyzable chloride} \times 100}{12.06}$$

TABLE I

| Ex. | Mols NaOH employed | Percent of excess ECH [2] recover | Final product analysis | | | | |
|---|---|---|---|---|---|---|---|
| | | | Percent epoxy oxygen | Percent DGE [1][3] | Percent hydrolyzable chloride | Percent DHCPE [1][4] | Total analysis, percent |
| II | 0.05 | 93 | 6.46 | 97 | 0.19 | 1 | 98 |
| III | 0.10 | 92 | 6.44 | 97 | 0.20 | 1 | 98 |
| IV | 0.20 | 94 | 6.58 | 98 | 0.27 | 2 | 100 |
| V | 0.35 | 94 | 6.16 | 92 | 0.48 | 4 | 96 |
| VI | 0.80 | 69 | 4.51 | 68 | 2.60 | 20 | 88 |

[1] All calculations rounded to nearest whole percent.
[2] ECH=Epichlorohydrin.
[3] DGE=Diglycidyl ether of tetrachlorobisphenol-A.
[4] DHCPE=Di(beta-hydroxyl-gamma-chloro-n-propyl) ether of tetrachlorobisphenol-A.

Several pertinent observations can be made from the above table. First when the mols of NaOH employed per mol of tetrachlorobisphenol-A is from 0.05 to 0.20, the analysis for diglycidyl ether and di(beta-hydroxy-gamma-chloro-n-propyl) ether are substantially 100%. This result confirms the fact that there are only two components in the reaction product and that substantially no polymeric epoxides have been formed by the condensation of tetrachlorobisphenol-A with the diglycidyl ether of tetrachlorobisphenol-A. Secondly, when the mols of NaOH employed per mol of tetrachlorobisphenol-A is from 0.35 to 0.80, the analyses for diglycidyl ether and di(beta-hydroxy-gamma-chloro-n-propyl) ether are substantially less than 100%. This fact indicates that the reaction product contains more than two components. The unaccounted for material is largely polymers formed by the condensation of tetrachlorobisphenol-A with the diglycidyl ether of tetrachlorobisphenol-A. This conclusion is confirmed by the low epoxy oxygen analyses of the products.

The attached FIG. I is based upon the data of Table I and graphically illustrates the effect that the ratio of alkali to tetrachlorobisphenol-A employed in the first step of the process has upon the epoxy oxygen analysis of the product. The diglycidyl ether produced for the process of this invention should have an epoxy oxygen analysis of at least about 6.2 weight percent and preferably at least about 6.4 weight percent. Accordingly, the maximum quantity of alkali to be employed per mol of tetrachlorobisphenol-A should not exceed about 0.35 mol and preferably should not exceed about 0.25 mol. The minimum quantity of alkali to be employed should be at least about 0.05 mol and more especially at least about 0.1 mol. In a preferred embodiment of the invention, 0.15–0.25 mol of alkali should be employed per mol of tetrachlorobisphenol-A.

The temperature to which the reactants are heated in the first step of the process before the addition of the alkali thereto also has an important influence on the reaction. If the reactants are not heated to a temperature of at least 50° C., the rate of reaction (1) is unduly slow and a high percentage of polymeric epoxides may be obtained in the final reaction product. At temperatures in the range of 50–95° C., the reaction proceeds readily and at least about 92% and usually about 95% of any excess epichlorohydrin employed in the reaction can be recovered. When the reaction is initiated at temperatures above 95° C., e.g., at temperatures of 115–120° C., a substantial percentage of any excess epichlorohydrin employed is destroyed and the recovery of this relatively costly reactant may fall as low as 85%.

The tetrachlorobisphenol-A employed in the invention is the nuclearly chlorinated product obtained by chlorinating bisphenol-A in the dark. The bisphenol-A that is chlorinated may be either of the three common isomers, viz., 4,4'-isopropylidenebisphenol, 2,2'-isopropylidenebisphenol, or 2,4'-isopropylidenebisphenol or the commercial mixture of these isomers in which the 4,4'-isopropylidenebisphenol predominates. The chlorination takes place predominantly on carbon atoms that are either ortho or para to the hydroxyl group. Thus, the three principal tetrachlorobisphenol-A isomers are 4,4'-isopropylidenebis(2,6-dichlorobisphenol), 2,2'-isopropylidenebis(4,6-dichlorobisphenol) and 2,4'-isopropylidene-4,6,2',6'-tetrachlorobisphenol. The principal isomer obtained by chlorinating the commercial mixture of bisphenol-A is 4,4'-isopropylidenebis(2,6-dichlorophenol).

The diglycidyl ethers of the tetrachlorobisphenol-A compounds may be reacted with polyfunctional organic compounds containing a plurality of reactive hydrogen atoms to prepare thermoplastic and thermosetting resins. These resins may be employed in the preparation of coating compositions and the manufacture of molded articles, etc.

Protective coating compositions can be prepared from a mixture of 50 parts xylene, 50 parts of the diglicidyl ether of any of the tetrachlorobisphenol-A compounds and 2.5 parts of tetraethylene tetramine. The articles to be protected, e.g., metal articles, may be coated with this solution and the film can be cured to a hard thermoset condition by heating for 0.5 hour at 225° F.

An air-drying varnish resin may be prepared by heating a mixture of 60 parts of soybean oil fatty acids, 40 parts of the diglycidyl ether of any of the tetrachlorobisphenol-A compounds and 1 part of tetraethylene tetramine for 2–3 hours at 250° C. until the viscosity of the varnish is about W on the Gardner-Holdt scale. The varnish may be dissolved in a suitable solvent such as xylene or aliphatic hydrocarbons to prepare air-drying coating compositions. In compositions of this type it is preferable to include a small quantity of a drier such as a cobalt naphthalate.

Hard thermoset castings can be prepared by melting approximately 96 parts of the diglycidyl ether of any of the tetrachlorobisphenol-A compounds, incorporating about 4 parts of tetraethylene tetramine therein and curing the resin by heating for 24 hours at 150° C. Such castings are very tough and will not support combustion except when a flame is applied directly thereto.

The above descriptions and particularly the examples are set forth by way of illustration only. Many other variations and modifications thereof can be made without departing from the spirit and scope of the invention herein described.

This application is a continuation-in-part of my copending application S.N. 621,908, filed November 13, 1956, now abandoned.

What is claimed is:

1. The method for preparing a di(beta-hydroxy-gamma-chloro-n-propyl) ether of a tetrachlorobisphenol-A compound which consists of heating a mixture of 1 molar portion of a tetrachlorobisphenol-A compound and at least 2 molar portions of epichlorohydrin to a temperature of 50–95° C., adding thereto in a single charge 0.05–0.40 equivalent of alkali and maintaining the reaction mixture at reflux temperature until all of the tetrachlorobisphenol-A compound in the reaction mixture has been converted to the di(beta-hydroxy-gamma-chloro-n-propyl) ether of the tetrachlorobisphenol-A compound; said tetrachlorobisphenol-A compound being selected from the group consisting of 4,4'-isopropylidenebis(2,6-dichlorophenol), 2,2'-isopropylidenebis(4,6-dichlorophenol), 2,4'-isopropylidene-4,6,2',6'-tetrachlorobisphenol and mixtures thereof.

2. The method of claim 1 wherein 0.15–0.25 equivalent of alkali is employed.

3. The method of claim 2 in which the alkali employed is an alkali metal hydroxide.

4. The method for preparing a diglycidyl ether of a tetrachlorobisphenol-A compound which consists of (a) heating a mixture of 1 molar portion of a tetrachlorobisphenol-A compound and at least 2 molar portions of epichlorohydrin to a temperature of 50–95° C., adding thereto in a single charge 0.05–0.40 equivalent of alkali and maintaining the reaction mixture at reflux temperature until all of the tetrachlorobisphenol-A compound in the reaction mixture has been converted to the di(beta-hydroxy-gamma-chloro-n-propyl) ether of the tetrachlorobisphenol-A compound, (b) distilling any unreacted epichlorohydrin from the reaction mixture of step (a) and (c) treating the reaction mixture from step (b) with alkali to form a diglycidyl ether of a tetrachlorobisphenol-A compound; the quantity of alkali employed in steps (a) and (c) constituting at least 2 equivalents, said tetrachlorobisphenol-A compound being selected from the group consisting of 4,4'-isopropylidenebis(2,6-dichlorophenol), 2,2'-isopropylidenebis(4,6-dichlorophenol), 2,4'-isopropylidene - 4,6,2',6' - tetrachloro - bis - phenol and mixtures thereof.

5. The method of claim 4 wherein 0.15–0.25 molar portion of alkali is employed in step (a).

6. The process of claim 5 wherein the alkali employed in steps (a) and (c) is an alkali metal hydroxide.

References Cited in the file of this patent
UNITED STATES PATENTS

| | | |
|---|---|---|
| 2,467,171 | Werner | Apr. 12, 1949 |
| 2,506,486 | Bender et al. | May 2, 1950 |
| 2,581,464 | Zech | Jan. 8, 1952 |
| 2,640,037 | Parry | May 26, 1953 |
| 2,719,089 | Lovell | Sept. 27, 1955 |
| 2,841,595 | Pezzaglia | July 1, 1958 |